(12) United States Patent
Shaffer

(10) Patent No.: US 8,949,346 B2
(45) Date of Patent: Feb. 3, 2015

(54) SYSTEM AND METHOD FOR PROVIDING A TWO-TIERED VIRTUAL COMMUNICATIONS ARCHITECTURE IN A NETWORK ENVIRONMENT

(75) Inventor: Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 899 days.

(21) Appl. No.: 12/712,240

(22) Filed: Feb. 25, 2010

(65) Prior Publication Data

US 2011/0208807 A1  Aug. 25, 2011

(51) Int. Cl.
*G06F 13/00* (2006.01)
*G06F 3/041* (2006.01)
*G06F 3/0488* (2013.01)

(52) U.S. Cl.
CPC .......... *G06F 3/0418* (2013.01); *G06F 3/04883* (2013.01); *G06F 2203/04807* (2013.01)
USPC .......................................... 709/206; 709/204

(58) Field of Classification Search
CPC .... G06Q 50/01; G06Q 10/107; G06F 3/0418; G06F 3/04883; G06F 2203/04807
USPC ........................... 709/204–207; 715/751–759
See application file for complete search history.

(56) References Cited

U.S. PATENT DOCUMENTS

| | | | |
|---|---|---|---|
| 6,691,154 B1 * | 2/2004 | Zhu et al. ....................... | 709/204 |
| 7,340,502 B2 * | 3/2008 | Richardson et al. .......... | 709/204 |
| 7,734,690 B2 * | 6/2010 | Moromisato et al. ......... | 709/204 |
| 2002/0054044 A1 * | 5/2002 | Lu et al. ........................ | 345/536 |
| 2004/0083263 A1 * | 4/2004 | Richardson et al. .......... | 709/204 |
| 2008/0244418 A1 | 10/2008 | Manolescu et al. | |
| 2009/0138808 A1 * | 5/2009 | Moromisato et al. ......... | 715/758 |
| 2010/0153160 A1 * | 6/2010 | Bezemer et al. ................. | 705/8 |

OTHER PUBLICATIONS

Smart Technologies, "SMART Board™: Interactive Whiteboard," 2 pages; © 2005.
UC Berkeley, "Tele-Immersion@UC Berkeley: Introduction," 1 page; printed on Feb. 22, 2010.
eBeam Interactive, 1 page; on Feb. 22, 2010.
"Dabbleboard: The whiteboard reinvented," 2 pages; printed on Feb. 22, 2010.
Buttolo, Pietro, et al., "Architectures for Shared Haptic Virtual Environment," 10 pages; *Computers and Graphics*, 1997.

(Continued)

*Primary Examiner* — Kenneth Coulter
(74) *Attorney, Agent, or Firm* — Patent Capital Group

(57) ABSTRACT

An example method is provided and includes receiving information indicative of a marking on an electronic display. Data related to the marking is communicated to a first memory element and to a second memory element. The data is used to render a local image on the electronic display, and the local image being removed over a configured time period. The method further includes receiving additional data to be used to replace the local image on the electronic display. The additional data is received via the second memory element, and the additional data is generated when at least a portion of the local image has been changed. The local image can have an associated time to live parameter for removing the local image, which is configured to be longer than a delay for data propagation between the electronic display and a collaboration server that includes the second memory element.

23 Claims, 4 Drawing Sheets

(56) References Cited

OTHER PUBLICATIONS

Sun, Chengzheng, et al., "Consistency Maintenance in Real-Time Collaborative Image Editing Systems," 41 pages; Mar. 2002; ACM Transactions on Computer-Human Interaction, vol. 9, No. 1.

Greenberg, S., et al., "Human and Technical Factors of Distributed Group Drawing Tools," 36 pages; *Interacting with Computers*, Dec. 1992.

Li, D., et al., "A New Paradigm of User Intention Preservation in Realtime Collaborative Editing Systems," 8 pages; 2000 Publication Date; ISBN: 0-7695-0568-6.

Prakash, A., et al., "Data Management Issues and Trade-Offs in CSCW Systems," 15 pages; Jan./Feb. 1999 Publication Date; IEEE Transactions on Knowledge and Data Engineering, vol. 11, No. 1; ISSN: 1041-4347.

\* cited by examiner

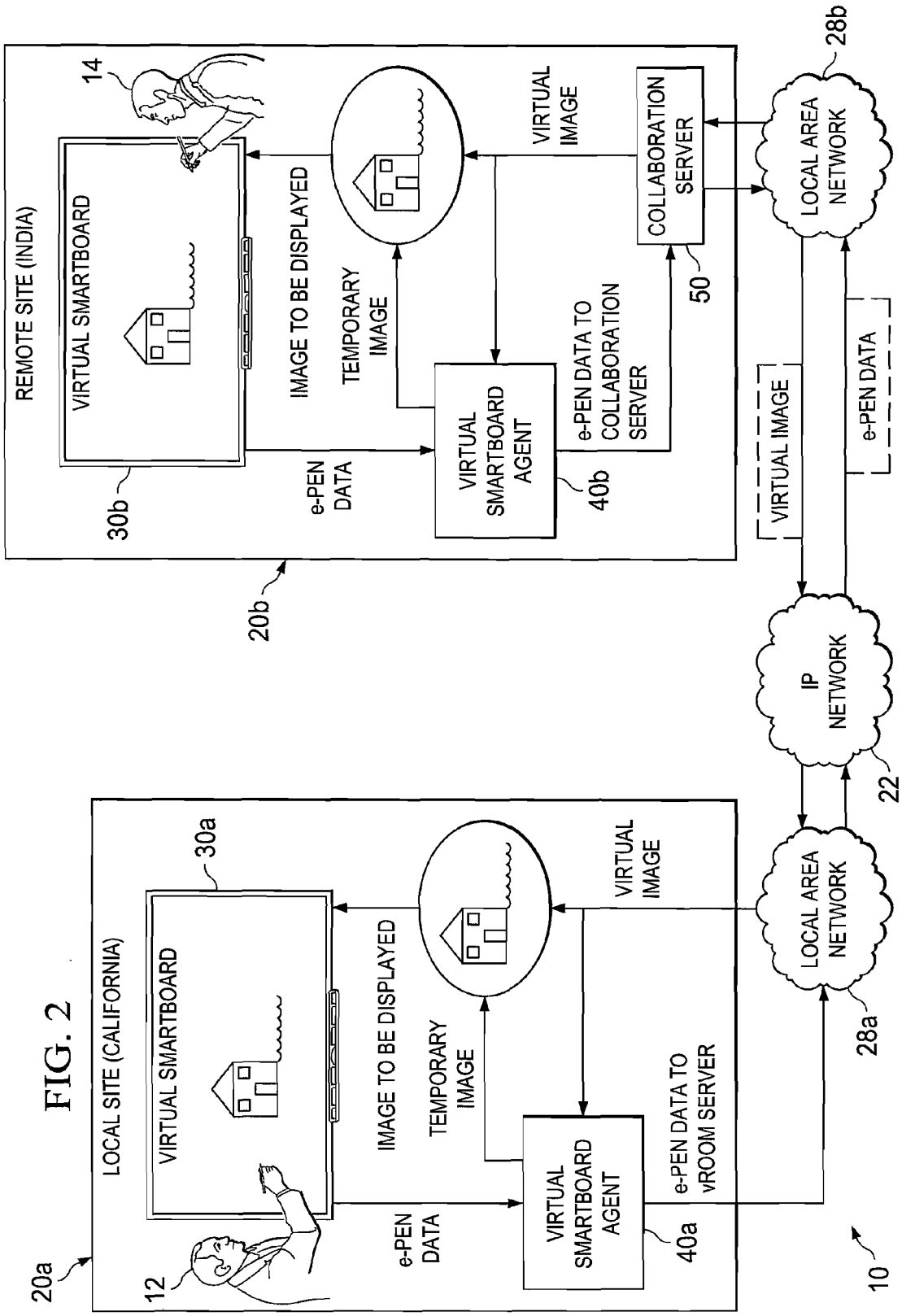

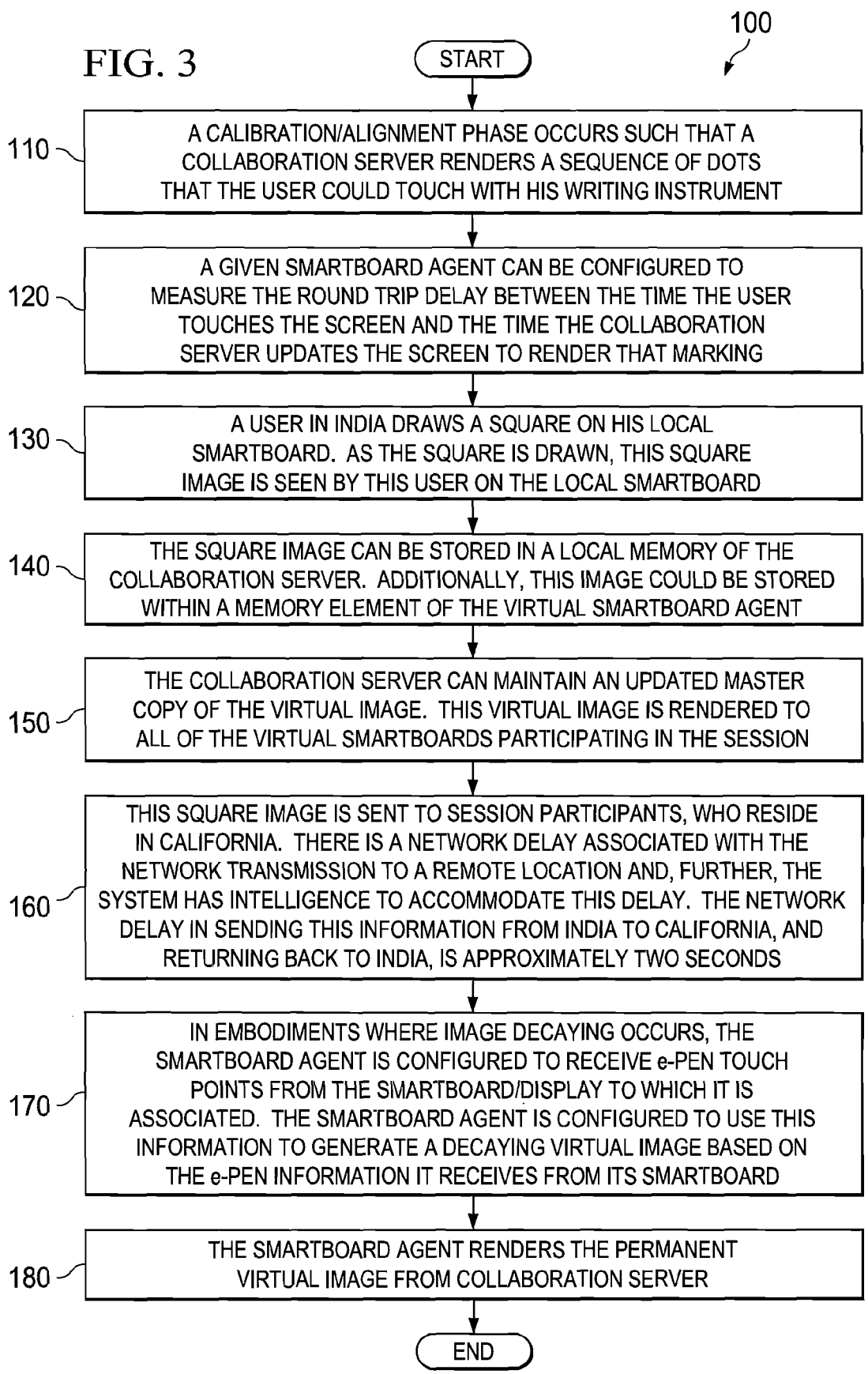

SYSTEM AND METHOD FOR PROVIDING A TWO-TIERED VIRTUAL COMMUNICATIONS ARCHITECTURE IN A NETWORK ENVIRONMENT

TECHNICAL FIELD

This disclosure relates in general to the field of communications and, more particularly, to providing a two-tiered virtual communications architecture in a network environment.

BACKGROUND

In certain architectures, service providers and/or enterprises may seek to offer sophisticated conferencing services for their end users. The conferencing architecture can offer an "in-person" meeting experience over a network. Conferencing architectures can deliver real-time, face-to-face interactions between people using advanced visual, audio, and collaboration technologies. Virtual meetings and conferences have an appeal, because they can be held without the associated travel inconveniences and costs. In addition, virtual meetings can provide a sense of community to participants who are dispersed geographically. Some virtual room technologies can include the use of electronic whiteboards, which can be used in conjunction with network technologies. Issues have arisen in conferencing scenarios in which network data traverses long distances. Optimally coordinating virtual room technologies presents a significant challenge to system designers, network operators, and component manufacturers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified schematic diagram illustrating an example operation associated with the communication system; and FIG. 3 is a simplified flowchart illustrating a series of example steps associated with the communication system.

DETAILED DESCRIPTION OF EXAMPLE EMBODIMENTS

Overview

A method is provided in one example embodiment and includes receiving information indicative of a marking on an electronic display. Data related to the marking is communicated to a first memory element and to a second memory element. The data is used to render a local image on the electronic display, and the local image being removed over a configured time period. The method further includes receiving additional data to be used to replace the local image on the electronic display. The additional data is received via the second memory element, and the additional data is generated when at least a portion of the local image has been changed. The local image can have an associated time to live parameter for removing the local image, which is configured to be longer than a delay for data propagation between the electronic display and a collaboration server that includes the second memory element.

In more specific embodiments, the method can include combining first image data from the second memory element with second image data from the first memory element to render an updated image for the electronic display. The time to live parameter can be configured via a calibration phase in which a sequence of markings is made by a writing instrument that is operative to interact with the electronic display. In yet other embodiments, the method can include maintaining the configured time period for removing the local image on a per-pixel basis. If a delay between the electronic display and the collaboration server is shorter than a specified threshold, activities associated with the local image being removed over the configured time period are bypassed.

Example Embodiments

Figure 1A:
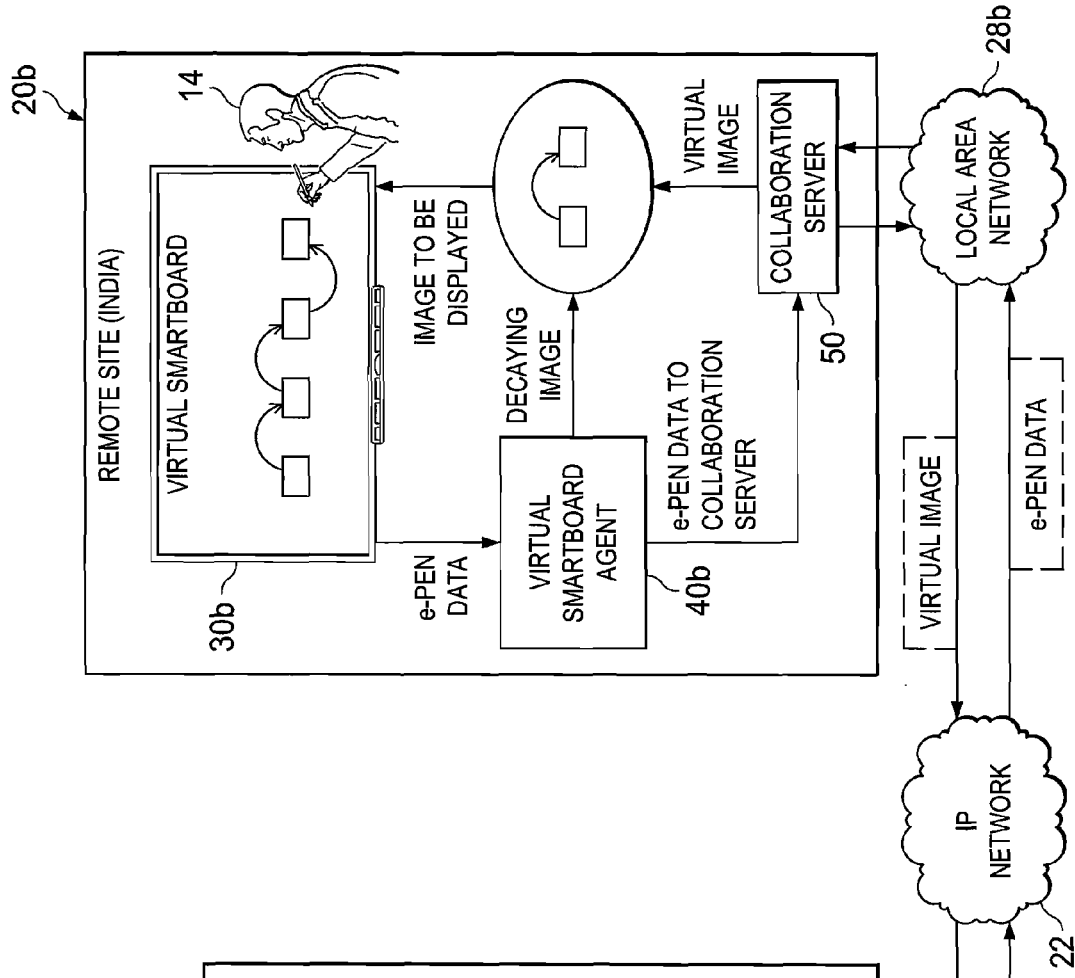
FIG. 1A is a simplified schematic diagram of a communication system for providing a two-tiered virtual room architecture in accordance with one embodiment of the present disclosure.
Figure 1A:
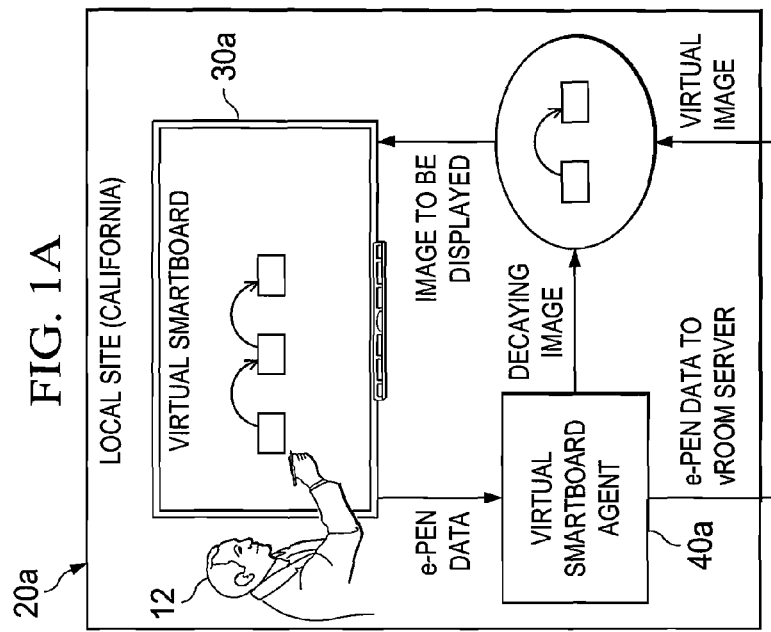

Turning to FIG. 1A, FIG. 1A is a simplified block diagram of a communication system 10 offering a two-tiered virtual room architecture in accordance with one example implementation of the present disclosure. FIG. 1A includes multiple end users 12, 14, which are participating in a conference that has various multimedia such as audio, video, and collaboration capabilities, as detailed below. In this example configuration, end user 12 is at a local site (California), which has its own virtual room 20a. Similarly, end user 14 is at a remote site (India), which has its own virtual room 20b. Virtual rooms 20a-b may be connected over any suitable link and, when in session, may be considered to be the same virtual room. In this particular example, communications between the local site and the remote site are facilitated by a set of local area networks (LANs) 28a-b, which can be joined by a wide area network (WAN) (e.g., an Internet protocol (IP) network 22, as is illustrated).

The local site in California includes a virtual smartboard 30a and a virtual smartboard agent 40a. The remote site in India includes a virtual smartboard 30b, a virtual smartboard agent 40b, and a collaboration server 50. Note that virtual smartboard 30a-b may be combined with respective virtual smartboard agents 40a-b as one integral component, or these elements may simply communicate with each other over any suitable wired or wireless link. It should also be noted that collaboration server 50 can be located in the California site or at any other location, where it has connectivity to IP network 22.

Communication system 10 is configured to offer a two-tiered mechanism that resolves a number of problematic delay/timing issues prevalent in conference scenarios in which electronic whiteboards are used. As a general proposition, each virtual smartboards 30a-b can have an associated virtual smartboard agent 40-b, which is configured to maintain virtual image data. Virtual smartboard agents 40a-b can interact with collaboration server 50 (i.e., a main centralized server) in a peer-to-peer relationship to form a distributed architecture. More specifically, and in accordance with one embodiment, communication system 10 is configured to use a decaying local image protocol in its operations. A local smartboard agent can erase the local copy of a recent drawing after a short time (e.g., a time equivalent to the round trip delay between the specific smartboard agent and collaboration server 50). In the case where collaboration server 50 is located in an arbitrary location attached to IP network 22, there are three locations for which to account. The "round trip delay" can reflect the round trip time between each smartboard and collaboration server 50. Hence, there could be two different delays when managing two smartboards in a single conference (i.e., a given virtual room). The decaying activity of communication system 10 is discussed below with reference to FIG. 1A.

In accordance with another embodiment, smartboard agents 40a-b do not rely on network delay measurements. Instead, smartboard agents 40a-b are configured to delete (or to update) their temporary virtual images as soon as smartboard agents 40a-b receive a corresponding image from collaboration server 50. These updating activities are discussed below with reference to FIG. 2. In terms of advantages, communication system 10 can eliminate the problematic visual affect of delay that occurs when an end user draws a line on a local smartboard and, subsequently, when that line actually appears on the screen. Additionally, communication system 10 can maintain a central virtual image, which can ensure that all users share a common view. This is important in scenarios where participants of the session are constantly modifying, erasing, and/or otherwise sharing and editing the common image. Details relating to possible internal components for each virtual room 20a-b are provided below with reference to FIG. 1B.

Note that before turning to the example flows and infrastructure of example embodiments of the present disclosure, a brief overview of the conferencing environment is provided for the audience. When individuals engage in a conferencing session, virtual room (vRoom) sessions can take place between participants in different locations. As part of a vRoom session, users can utilize whiteboards to share their ideas amongst participants connected to a session. This includes participants from all geographic locations and, further, these participants may be located a considerable distance away from each other (e.g., at opposite ends of the country, overseas, etc.).

In these sessions, a participant from any location can draw and/or erase on his respective whiteboard, where the participant can use some type of instrument (e.g., an e-pen configured especially for such electronic whiteboard activities) that leaves no physical ink marks behind. Rather, the location where an e-pen touches the whiteboard is sent to a central vRoom server. Such activities can be based on pixel processing (i.e., pixel-location determinations) being used instead of conventional grease markers that are provided in rudimentary whiteboard scenarios. The vRoom server (e.g., collaboration server 50) can construct a virtual image in its memory and then render this virtual image to all displays/whiteboards.

In a similar fashion, when any participant erases a portion of a drawing on the whiteboard (e.g., using an e-eraser), the whiteboard senses the location of the erased image and sends this information to the vRoom server (e.g., collaboration server 50). As a consequence, the vRoom server updates the virtual image in its memory to reflect the erased portion of the virtual image and, subsequently, renders the updated virtual image to all whiteboards/displays that are part of the session. This protocol can work satisfactorily when all vRooms (and collaboration server 50) are connected over a low-delay network and the image processing time is negligible. For example, if the participants are in the same building and are simply residing on different floors, then this system and associated protocol could work for its intended purpose. A completely local model would also offer adequate performance in these scenarios. However, a local model would not properly accommodate interactions between participants, who are dispersed geographically and, hence, utilize a WAN with a noticeable delay.

As the distance between participants (and between the participants and collaboration server 50) increases, network delay would similarly increase. This can result in a number of problems for the participants performing whiteboard activities. For example, if collaboration server 50 were provisioned a significant distance away from a participant, as that participant drew on his whiteboard, there could be a significant delay in what this participant sees. Stated differently, the participant may think that the drawing instrument is not being responsive to his input, when (in fact) it is the network delay that is responsible for him not seeing his whiteboard markings promptly.

Consider an example in which an engineer from Israel uses his e-pen to draw on his smartboard for his colleagues in California. That particular signal from the vRoom in Israel travels to a collaboration server in California, where the collaboration server modifies its stored virtual image in the collaboration server. The modified image is then sent to the whiteboard in Israel, where it modifies the image on the whiteboard in the Israeli vRoom. When the round-trip delay (between Israel and California) is long, as the user modifies (i.e., draws/erases/edits) the display, nothing happens for an appreciable time interval (e.g., one second or longer). The image would only then be modified after the delay elapses. Confused users often try to rewrite or to redraw what they had just drawn on the smartboard: thinking that their e-pen is not functioning properly. The important delay is between the vRooms and the location of collaboration server 50, which does not need to be necessarily located at/in one of the vRooms. Note that when the two vRooms are at distant locations (where a large network delay exists between them), no matter where collaboration server 50 is provisioned, there will be a long delay between collaboration server 50 and at least one conference participant.

It should also be noted that, although the network delay is being discussed in these scenarios, this network delay is compounded by other system delays such as the processing time required to determine the location of an e-pen on a whiteboard, the processing time of the virtual image in the collaboration server, the rendering time of an image to the various locations, the display time (inherent in the displays themselves), etc. Additionally, in video conferences, the delay issues may be less noticeable because both the voice and the video from a remote site are typically synchronized. Local users may assume that a remote user is thinking for a moment, before he naturally responds to what was previously said in the video conference. Thus, a natural cadence occurs in these scenarios such that the noticeable impact of the network delay is negligible. In the context of e-pen applications, however, the user expectation is to have a line appear instantly as the e-pen moves on the whiteboard and not later when the e-pen is already inches away from the original spot of the electronic whiteboard.

In contrast to these flawed activities, communication system 10 can offer a two-tiered approach in which the first tier maintains a temporary image, which appears on a display as soon as a local user draws an object on his smartboard. The temporary image can be replaced by a common virtual image from (i.e., the second tier) collaboration server 50, as soon as it arrives. Collaboration server 50, which can be located remotely on the other side of a high-delay network, can send this common virtual image from its associated memory. For example, as a local user draws the object on his smartboard, it can be stored in a local memory (e.g., within virtual smartboard 30a-b and/or within virtual smartboard agent 40a-b). In a parallel fashion, this same object can be sent to a centralized server (e.g., collaboration server 50), which can be located anywhere. This locally drawn object is sent to the centralized collaboration server 50, which in turn sends the image to all participating vRooms for all participants to see. The centralized collaboration server 50 can also send the same drawn object back to the local memory. This transmission would have incurred some network delay (e.g., two seconds), as further detailed below. Because the same object is being sent to collaboration server 50, the same object would be drawn at the exact same location (as originally drawn) of the local smartboard. In a general sense, the local smartboard received an initial instruction to draw the object, and that instruction was stored in a local memory. The user saw the object that he drew in approximately real-time and, further, this timely representation met the user's expectations. In a parallel manner, that same drawn object was sent to the centralized location (e.g., collaboration server 50), which promptly sent updates to all the participant's smartboards, and forwarded it back to the local memory in which the original image was drawn (e.g., where some network delay occurred). The term 'local' can represent activity occurring at the same place where the user is editing an image. In other instances, this term is indicative of an entity (or user) being collocated with collaboration server 50. In still other scenarios, this term indicates being in the same location as a given smartboard.

Hence, there is a small time interval in which two commands are given to the local smartboard. One command can come from the local memory (where this local image will ultimately decay), and a second command can come from memory residing in collaboration server 50. According to its intelligence, the local image would begin to decay on the local smartboard, where that decay time (i.e., a time to live parameter) is intelligently set. In this example configuration, the round-trip time is shorter than the decay time of the local image. However, the image from collaboration server 50 would remain unaffected by the decaying image from the corresponding smartboard agent. In this manner, the drawn object is effectively being maintained in place by collaboration server 50. Note that drawing the object twice (i.e., receiving commands from two different locations) would still result in a single line being drawn. This is because pixels drawn would be congruent and, therefore, having two commands to draw the same line would not result in a visual difference to participants of the session. Stated otherwise, when two lines are drawn over the same area, and one line decays, the resultant is a single line that is sufficient and not changing with time.

Before turning to some of the additional operations of this architecture, a brief discussion is provided about some of the infrastructure of FIG. 1A. End users 12, 14 are representative of a client or a user wishing to participate in a network session in communication system 10. Each virtual room 20a-b may be inclusive of devices used to initiate (or to foster) a communication such as a switch, a console, a proprietary endpoint, a telephone, a camera, a microphone, a dial pad, a bridge, a computer, a personal digital assistant (PDA), a laptop or electronic notebook, a Call Manager element, or any other device, component, element, or object capable of initiating and managing voice, audio, data exchanges, or sessions within communication system 10. Each virtual room 20a-b may also include a suitable interface to the human user such as a microphone, a camera, a display, or a keyboard or other terminal equipment. This can include any device that seeks to initiate and/or manage a communication on behalf of another entity or element such as a program, a database, or any other component, device, element, or object capable of initiating a voice or a data exchange within communication system 10. Data, as used herein in this document, refers to any type of video, numeric, voice, media, or script data, or any type of source or object code, or any other suitable information in any appropriate format that may be communicated from one point to another.

In operation, virtual rooms 20a-b can use technologies in conjunction with specialized applications and hardware to create a conference that can leverage the network. Communication system 10 can use standard IP technology deployed in corporations and, further, also run on an integrated voice, video, and data network. The system can also support high quality, real-time voice, and video communications with branch offices using broadband connections. They can further offer capabilities for ensuring quality of service (QoS), security, reliability, and high availability for high-bandwidth applications such as video. Furthermore, communication system 10 can operate in conjunction with various conferencing technologies. For example, such arrangements may be inclusive of (but not limited to) virtual conferencing technologies such as Polycom, Acrobat Connect, Elluminate Live, Microsoft Live Meeting, Webex, Second Life, TelePresence, etc. Power and Ethernet connections can be provided for all participants. Participants can use their laptops to access data for the session, join a meeting place protocol or a Web session, or stay connected to other applications throughout the meeting.

IP network 22 represents a WAN comprising a series of points or nodes of interconnected communication paths for receiving and transmitting packets of information that propagate through communication system 10. IP network 22 offers a communicative interface between sites (and/or participants) and may be any LAN, wireless LAN (WLAN), metropolitan area network (MAN), WAN, extranet, Intranet, virtual private network (VPN), or any other appropriate architecture or system that facilitates communications in a network environment. IP network 22 can support a transmission control protocol (TCP)/IP, or a user datagram protocol (UDP)/IP in particular embodiments of the present disclosure; however, IP network 22 may alternatively implement any other suitable communication protocol for transmitting and receiving data packets within communication system 10. Note also that IP network 22 can accommodate any number of ancillary activities, which can accompany a session. This network connectivity can facilitate all informational exchanges (e.g., notes, virtual whiteboards, PowerPoint presentations, e-mailing, word-processing applications, etc.). Along similar reasoning, LANs 28a-b can foster all such communications and, further, be replaced by any suitable network components for facilitating the propagation of data between participants in a conferencing session.

Figure 1B:
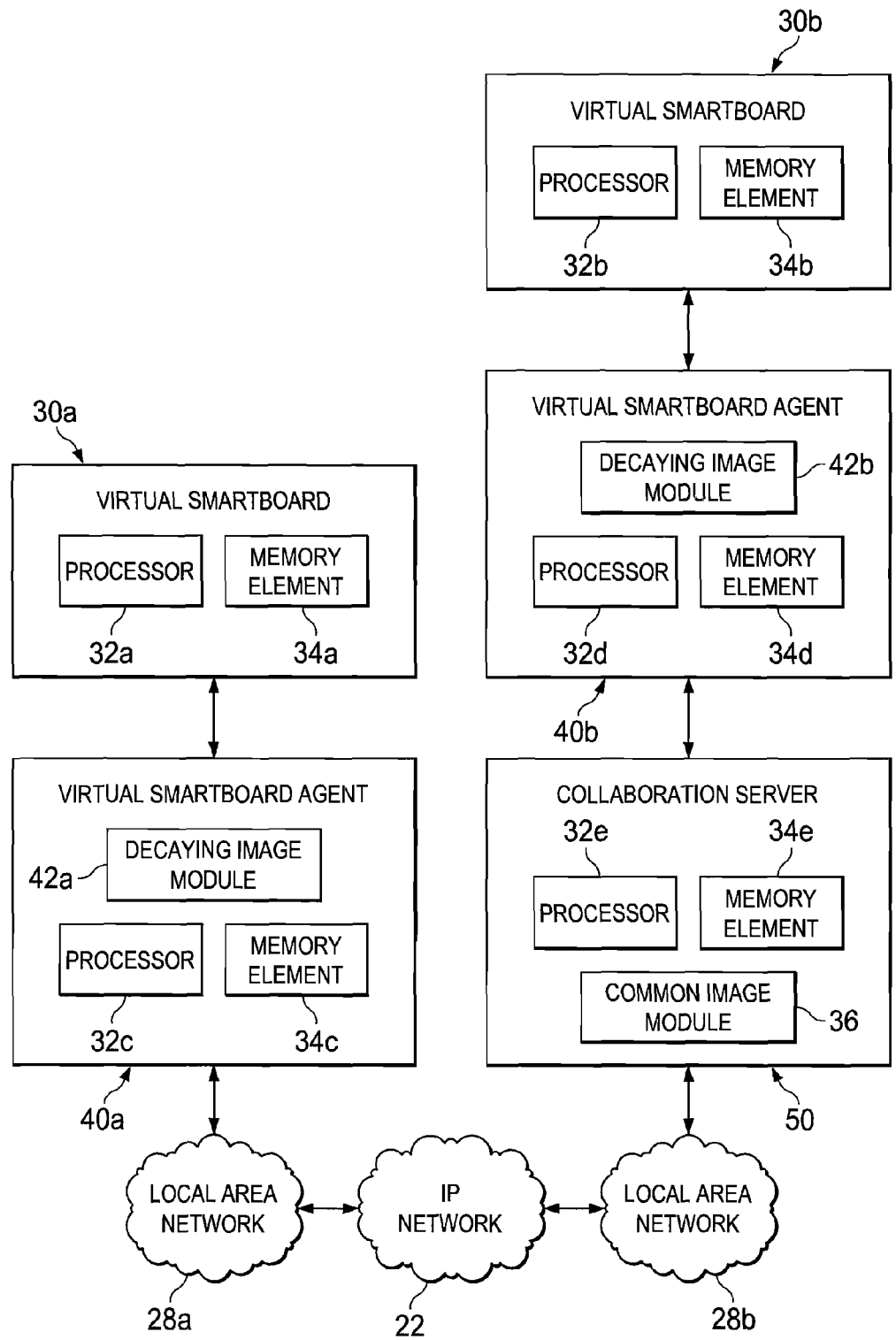
FIG. 1B is a simplified block diagram illustrating additional details related to an example infrastructure of the communication system in accordance with one embodiment.

Turning to additional infrastructure details, FIG. 1B is a simplified block diagram illustrating one potential configuration for communication system 10. In this particular example of FIG. 1B, each virtual smartboard 30a-b may include a respective processor 32a-b and a respective memory element 34a-b. Additionally, each virtual smartboard agent 40a-b may include a respective processor 32c-d and a respective memory element 34c-d. Both virtual smartboard agents 40a-b may also include a decaying image module 42a-b, which can be configured to systematically decay locally drawn images on a respective smartboard based on calculated timing parameters, as discussed herein. Note that virtual smartboard 30a-b and virtual smartboard agents 40a-b may share (or coordinate) certain processing operations. Using a similar rationale, their respective memory elements may store, maintain, and/or update data in any number of possible manners. Because the agents and the smartboards can be readily combined into a single unit, some of these processors may be removed, or otherwise consolidated such that a single processor and a single memory location is responsible for certain activities associated with each site. In a general sense, the arrangement depicted in FIGS. 1A-1B may be more logical in their representations, whereas a physical architecture may include various permutations/combinations/hybrids of these elements.

In addition, and as illustrated by FIG. 1B, collaboration server 50 may include a processor 32e, a memory element 34e, and a common image module 36. Common image module 36 may be configured to update smartboards for participants in a given session, as detailed herein. Note that the numerical and letter designations assigned to the elements of FIGS. 1A-B do not connote any type of hierarchy; the designations are arbitrary and have been used for purposes of teaching only. These designations should not be construed in any way to limit their capabilities, functionalities, or applications in the potential environments that may benefit from the features of communication system 10.

Virtual smartboards 30a-b are electronic surfaces for representing data to one or more participants. Data drawn on a respective virtual smartboard can be relayed to other individuals, who are participating in a given session. Virtual smartboards 30a-b may include a touch system such that an end user can use his finger to write, to erase, and to perform common mouse functions. In other instances, the end user can use gesture-based commands or some type of instrument (e.g., an e-pen, an e-eraser), a proprietary device, or a wireless device (e.g., pointing toward its target) in order to provide signals to virtual smartboards 30a-b. Note that as used herein in this Specification, the term 'electronic display' is meant to connote any element that is capable of rendering an image during a session. This would necessarily be inclusive of any panel, smartboard, screen, plasma element, television, monitor, electronic whiteboard, or any other suitable surface that is capable of such rendering.

Each virtual smartboard 30a-b may use any suitable software applications that can foster data creation for viewing during a session. This can include word-processing applications, graphics and video tools, PowerPoint presentation software, audio software, e-mail tools, etc. Additionally, each virtual smartboard 30a-b has the ability to save the information on its screen. Each virtual smartboard 30a-b also has the capability of introducing new files into the session (e.g., files that are stored in its local memory, files that were sent over e-mail and received by some participant in the session, files sent from a local computer (e.g., a PDA, laptop, desktop personal computer, etc.)). Virtual smartboards 30a-b can also have the ability to link to websites, to other computers, to PDAs, etc. via a wired or wireless connection. Virtual smartboards 30a-b can wirelessly connect laptops and transfer control of the interactive smartboard between users. Virtual smartboards 30a-b may be freestanding units, wall-mounted units, etc. and, further, include a projection mechanism (or be provided as part of a TelePresence architecture).

Each virtual smartboard agent 40a-b is a server configured to communicate in a network environment in accordance with one example implementation. Alternatively, virtual smartboard agents 40a-b may be any other suitable processor, network appliance, module, console, proprietary device, or any other suitable component that can foster the activities described herein. As used herein in this Specification, the term 'agent element' is meant to encompass all such design possibilities. Collaboration server 50 is similarly equipped for network communications in accordance with one example implementation. Alternatively, collaboration server 50 may be any other suitable device that can perform the operations discussed herein. In certain example implementations, collaboration server 50 can be combined with a nearby virtual smartboard agent such that a single unitary device performs the operations of both of these elements.

In one example implementation, common image module 36 and decaying image modules 42a-b are configured to execute the intelligent image rendering activities, as explained herein. In other scenarios, these elements can combine their efforts (or otherwise coordinate with each other) to perform the intelligent image rendering activities associated with the described conferencing operations. In other scenarios, collaboration server 50 and virtual smartboard agents 40a-b could be replaced by virtually any network element, a proprietary device, or anything that is capable of facilitating an exchange of image data. As used herein in this Specification, the term 'collaboration element' is meant to encompass servers, processors, or any other suitable device, network appliance, component, element, or object configured to exchange or to process information in a network conferencing environment. Moreover, collaboration server 50 and virtual smartboard agents 40a-b may include any suitable hardware, software, components, modules, interfaces, or objects that facilitate the operations thereof. This may be inclusive of appropriate algorithms and communication protocols that allow for the effective delivery and coordination of image data.

Turning to FIG. 3, FIG. 3 is a simplified flowchart illustrating one example scenario 100 that could be accommodated by communication system 10. Note that this particular flow is described in conjunction with the images being rendered in the example of FIG. 2 such that two sites are involved (California and India). The flow may begin at step 110, where a calibration/alignment phase occurs. This could involve a given collaboration server rendering a sequence of dots that the user could touch with his writing instrument (e.g., an e-pen). In addition to the normal calibration/alignment of a touch sensitive screen and a display, a given smartboard agent can be configured to measure the round trip delay between the time the user touches the screen and the time the collaboration server updates the screen to render that marking. This is reflected by step 120. This round trip time measurement can be continuously monitored, where it could be systematically refined by the smartboard agent.

At step 130, a user in India draws a square on his local smartboard 30b (e.g., such as that which is depicted in FIG. 2). As the square is drawn, this square image is seen by this user on the local smartboard. From a more detailed perspective, the pixel information is being provided to the local virtual smartboard, provided to the associated virtual smartboard agent, and provided to the collaboration server, which is provided locally in India. Thus, in this particular example, these three activities can occur (approximately) at time zero (t=0). FIG. 3 illustrates these timing activities in subsequent steps. Note that other timing parameters or timing criteria can certainly be employed and any such permutations are clearly within the scope of the presented concepts.

At steps 140-150, the square image can be stored in a local memory. More specifically, at this first phase, the image is stored in the memory of collaboration server 50 and the memory of virtual smartboard agent 40b associated with the decaying image. The image that is displayed to the end user can be written (at a later phase) to the memory of smartboard agent 30b. Thus, the square image is being sent to collaboration server 50, where it can be stored in any appropriate memory (e.g., memory element 34e). In regards to image rendering, collaboration server 50 can maintain an updated master copy of the virtual image. This virtual image is rendered to all of the virtual smartboards participating in the session. Unlike existing systems that render the virtual image from collaboration server 50 directly to an electronic whiteboard/display, this architecture is configured to render the virtual image to the smartboard agent, which modifies the virtual image prior to rendering it to the whiteboard/display.

It should be noted that if the delay between any given smartboard and collaboration server 50 is shorter than a given threshold (e.g., they are both on the same LAN with a delay below 50 ms), communication system 10 may bypass the use of decaying altogether. In another example embodiment, as depicted in FIG. 2, communication system 10 does not measure a network delay and configure its activities based on this measurement. Rather, a given smartboard agent can be configured to use the new virtual image information from the collaboration server to delete and to update a temporary image it manages. (Note that, as described earlier, both virtual smartboard agents 40a-b can include decaying image modules 42a-b. However, if virtual smartboard agents 40a-b were configured to simply update a temporary image being managed, then such modules would be replaced with components to achieve these operations. For example, each respective virtual smartboard agent 40a-b may include a temporary image module in place of decaying image modules 42a-b.)

Continuing along with this example, at step 160, the square image is sent to session participants, who reside in California. There is some appreciable network delay associated with the network transmission to a remote location and, further, given the fact that the user in India draws the square, the end user in California does not perceive the delay (i.e., he is oblivious to the delay even though it exists.) While there is no way to compensate for this specific network delay, there is also no need to compensate for it, as the user in California does not perceive it. In this particular instance, the specific information (related to a square drawn in India does not need to be sent over the high latency network, as the smartboard in India receives this information from collaboration server 50, which resides in India as well. In embodiments where image decaying occurs, the smartboard agent is configured to receive e-pen touch points from the smartboard/display to which it is associated. The smartboard agent is configured to use this information to generate a decaying virtual image based on the e-pen information it receives from its smartboard. This is illustrated at step 170.

In addition, the local smartboard agent is configured to combine (add) the virtual image it receives (e.g., the square image in this particular example) from the collaboration server with the decaying image it has generated, which was based on the e-pen touching the local smartboard. The sum of these images can be rendered to the local smartboard, which creates a seamless operation for the user, who drew the square. The local decaying image can have a time to live set to be equivalent to the round trip delay measured by the smartboard agent. In order to eliminate the impact from a variable network delay, the system can set the time to live for the decaying virtual image to be slightly larger than the network delay. In practical terms, the decay time could be set a bit longer than the delay to compensate for network jitter. Note also that the term "decaying" is not necessarily gradual; rather, until the decay timer expires the image exists in its full original intensity. As the timer expires, the image can be erased instantly in certain example implementations. Other scenarios could indeed involve a decaying, erosion, and/or fading activity for the image. It should also be noted that, in regards to a decaying image, the time (and the decay) can be calculated for each pixel separately, rather than waiting for the whole square as an image (i.e., the system can understand/interpret pixels).

Thus, in practical terms, as end user 12 in California draws a square with the e-pen on his smartboard, he can immediately see a line that arrives via the short delay loop through virtual smartboard agent 40a. As the round trip delay time elapses from transmissions extending from the local site to the remote site (where collaboration server 50 resides) and back, the local decaying image from the smartboard agent expires and is automatically erased. In its place, the smartboard agent renders the permanent virtual image from collaboration server 50, as is depicted at step 180. Note that, based on particular configurations, collaboration server 50 can simultaneously send this information to the respective smartboard agent and/or the smartboard directly. As a result of these operations, a local user sees a line he has drawn immediately after it is drawn; he does not have to wait for the virtual image to be updated in the collaboration server before the line is actually drawn on his smartboard/display.

In other example scenarios, when a user which is not co-located with collaboration server 50, an image can travel from the touched pixels on the smartboard in California to the local memory of virtual smartboard agent 40a (i.e., memory element 34c) and to the memory of collaboration server 50 (i.e., memory element 34e). The image can be rendered almost immediately via decaying image module 42a back to the smartboard memory (i.e., memory element 34a) and, at this juncture, it could be displayed to the end user in California. The local image would decay with time, but before decaying, the image from collaboration server 50 would arrive and maintain this square (until it is manually erased by one of the collaboration session participants). In another example embodiment, rather than a decaying image, the image in the memory of virtual smartboard agent 40a (i.e., memory 34c) would be automatically erased upon/by the arrival of the image from the memory of collaboration server 50.

Note that in certain example implementations, the image rendering functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1B) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 1B) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, common image module 36 and decaying image modules 42a-b include software in order to achieve the data rendering functions outlined herein. These activities can be facilitated by virtual smartboard agents 40a-b and collaboration server 50 respectively. Virtual smartboard agents 40a-b and collaboration server 50 can include memory elements for storing information to be used in achieving the intelligent data rendering, as outlined herein. Additionally, virtual smartboard agents 40a-b and collaboration server 50 may include a processor that can execute software or an algorithm to perform the image rendering activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of participants, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios where collaboration server 50 resides in one of the physical locations involving a smartboard, collaboration server 50 can reside in any location, provided it has some connectivity to IP network 22, LAN 28a, LAN 28b, etc., or any other suitable network.

It is also important to note that the steps discussed with reference to FIGS. 1A-3 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in conferencing environments or arrangements, the present disclosure may be used in any communications environment (e.g., with PDAs, laptops, etc.) that could benefit from such technology. Virtually any configuration that seeks to intelligently render data could enjoy the benefits of the present disclosure. Moreover, the architecture can be implemented in any system providing image rendering for one or more participants. In addition, although some of the previous examples have involved specific terms relating to a simplistic whiteboard configuration, the idea/scheme is portable to a much broader domain: including other conferencing products, telephony devices, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   receiving information indicative of a marking with an object on a surface of an electronic display;
   communicating data related to the marking to a first memory element associated with the electronic display and to a second memory element included in a collaboration server, wherein the data communicated to the first memory element is used to render a local image on the electronic display, the local image being gradually removed over a configured time period; and
   receiving from the collaboration server additional data to be used to replace the local image on the electronic display contemporaneously with the local image being gradually removed over the configured time period, wherein the additional data is generated when at least a portion of the local image has been changed.

2. The method of claim 1, wherein the local image has an associated time to live parameter for removing the local image, wherein the time to live parameter is configured to be longer than a delay for data propagation between the electronic display and the collaboration server that includes the second memory element.

3. The method of claim 2, further comprising:
   combining first image data from the second memory element with second image data from the first memory element to render an updated image on the electronic display.

4. The method of claim 2, wherein the time to live parameter is configured via a calibration phase in which a sequence of markings is made by a writing instrument that is operative to interact with the electronic display.

5. The method of claim 2, wherein the delay is measured during a session involving the electronic display in order to update an expiration time of the local image.

6. The method of claim 2, further comprising:
   maintaining the configured time period for removing the local image on a per-pixel basis, wherein if a delay between the electronic display and the collaboration server is shorter than a specified threshold, activities associated with the local image being removed over the configured time period are bypassed.

7. The method of claim 1, further comprising:
   maintaining a master copy of a plurality of images for the electronic display; and
   communicating the master copy of the plurality of images to one or more additional electronic displays.

8. The method of claim 1, further comprising:
   using the additional data to delete and to update temporary image data being maintained for the electronic display.

9. Logic encoded in one or more non-transitory tangible media that includes code for execution and when executed by a processor operable to perform operations comprising:
- receiving information indicative of a marking with an object on a surface of an electronic display;
- communicating data related to the marking to a first memory element associated with the electronic display and to a second memory element included in a collaboration server, wherein the data communicated to the first memory element is used to render a local image on the electronic display, the local image being gradually removed over a configured time period; and
- receiving from the collaboration server additional data to be used to replace the local image on the electronic display contemporaneously with the local image being gradually removed over the configured time period, wherein the additional data is generated when at least a portion of the local image has been changed.

10. The logic of claim 9, wherein the local image has an associated time to live parameter for removing the local image, wherein the time to live parameter is configured to be longer than a delay for data propagation between the electronic display and the collaboration server that includes the second memory element.

11. The logic of claim 10, wherein the operations further comprising:
- combining first image data from the second memory element with second image data from the first memory element to render an updated image on the electronic display.

12. The logic of claim 10, wherein the time to live parameter is configured via a calibration phase in which a sequence of markings is made by a writing instrument that is operative to interact with the electronic display.

13. The logic of claim 10, wherein the delay is measured during a session involving the electronic display in order to update an expiration time of the local image.

14. The logic of claim 10, wherein the operations further comprise:
- maintaining the configured time period for removing the local image on a per-pixel basis, wherein if a delay between the electronic display and the collaboration server is shorter than a specified threshold, activities associated with the local image being removed over the configured time period are bypassed.

15. The logic of claim 9, wherein the operations further comprise:
- using the additional data to delete and to update temporary image data being maintained for the electronic display.

16. An apparatus, comprising:
- a memory element configured to store electronic code,
- a processor operable to execute instructions associated with the electronic code, and
- an agent element configured to interface with the processor and further configured to:
  - receive information indicative of a marking with an object on a surface of an electronic display;
  - communicate data related to the marking to a first memory element associated with the electronic display and to a second memory element included in a collaboration server, wherein the data communicated to the first memory element is used to render a local image on the electronic display, the local image being gradually removed over a configured time period; and
  - receive from the collaboration server additional data to be used to replace the local image on the electronic display contemporaneously with the local image being gradually removed over the configured time period, wherein the additional data is generated when at least a portion of the local image has been changed.

17. The apparatus of claim 16, further comprising:
- an image module configured to interact with the electronic display, wherein the local image has an associated time to live parameter for removing the local image, wherein the time to live parameter is configured to be longer than a delay for data propagation between the electronic display and the collaboration server that includes the second memory element.

18. The apparatus of claim 17, wherein first image data from the second memory element is combined with second image data from the first memory element to render an updated image on the electronic display.

19. The apparatus of claim 17, wherein the configured time period for removing the local image is maintained on a per-pixel basis.

20. The apparatus of claim 17, wherein if a delay between the electronic display and the collaboration server is shorter than a specified threshold, activities associated with the local image being removed over the configured time period are bypassed.

21. The apparatus of claim 17, wherein the delay is measured during a session involving the electronic display in order to update an expiration time of the local image.

22. The apparatus of claim 16, wherein the collaboration server further comprises:
- a common image module configured to maintain a master copy of a plurality of images for the electronic display, wherein the master copy of the plurality of images is communicated to one or more additional electronic displays.

23. The apparatus of claim 16, wherein the agent element is further configured to:
- use the additional data to delete and to update temporary image data being maintained for the electronic display.

* * * * *